US010329192B2

(12) United States Patent
Kim et al.

(10) Patent No.: US 10,329,192 B2
(45) Date of Patent: Jun. 25, 2019

(54) COMPOSITION OF FINGERPRINT-RESISTANT LAYER CONSISTING OF A PLURALITY OF THIN FILMS AND PREPARATION METHOD THEREFOR

(71) Applicant: GAEMA TECH. CO., LTD., Yuseong-gu, Daejeon (KR)

(72) Inventors: Hun Rae Kim, Daejeon (KR); Zee Young Lee, Daejeon (KR)

(73) Assignee: Gaema Tech. Co., Ltd., Daejeon (KR)

( * ) Notice: Subject to any disclaimer, the term of this patent is extended or adjusted under 35 U.S.C. 154(b) by 639 days.

(21) Appl. No.: 14/787,253

(22) PCT Filed: Apr. 23, 2014

(86) PCT No.: PCT/KR2014/003510
§ 371 (c)(1),
(2) Date: Oct. 26, 2015

(87) PCT Pub. No.: WO2014/142636
PCT Pub. Date: Sep. 18, 2014

(65) Prior Publication Data
US 2016/0185659 A1 Jun. 30, 2016

(30) Foreign Application Priority Data

Mar. 11, 2013 (KR) .................. 10-2013-0025860

(51) Int. Cl.
*C03C 17/00* (2006.01)
*C03C 17/34* (2006.01)
(Continued)

(52) U.S. Cl.
CPC .............. *C03C 17/34* (2013.01); *C03C 15/00* (2013.01); *C03C 17/42* (2013.01);
(Continued)

(58) Field of Classification Search
CPC ................................. C03C 17/00; C03C 15/00
See application file for complete search history.

(56) References Cited

U.S. PATENT DOCUMENTS 5,326,584 A * 7/1994 Kamel .................. A61F 2/1613
216/58
5,846,649 A * 12/1998 Knapp ..................... B05D 1/62
428/334
(Continued)

FOREIGN PATENT DOCUMENTS

JP 2000-026844 A 1/2000
JP 2000-144097 A 5/2000
(Continued)

OTHER PUBLICATIONS

Mechanism of Biaxial Alignment of Oxide Thin Films during Ion-Beam-Assisted Deposition, Kevin G. Ressler, Neville Sonnenberg, and Michael J. Cima, J. Am. Ceram. Soc., 80 [10] 2637-48 (1997).*
International Search Report dated Aug. 21, 2014 for PCT/KR2014/142636.

*Primary Examiner* — David P Turocy
*Assistant Examiner* — Mohammad Mayy
(74) *Attorney, Agent, or Firm* — Knobbe, Martens, Olson & Bear, LLP

(57) ABSTRACT

A composition for primer layer coating of a water- and oil-repellent coating layer so as to enhance the durability of the water- and oil-repellent coating layer, comprises a mixture which comprises at least one of a silicon oxide (SiOx) and titanium (Ti) compound, an aluminum (Al) compound and a zirconium (Zr) compound. A preparation method may comprise: preparing a glass or polymer substrate; forming, on the substrate, a portion on which a fingerprint-resistant layer is to be deposited within the substrate by etching; depositing a primer layer consisting of the composition on the surface of the substrate including the portion where the (Continued)

water- and oil-repellent coating layer is deposited; forming the water- and oil-repellent coating layer on the deposited primer layer; and purging the substrate on which the water- and oil-repellent coating layer is formed. The method has excellent wear-resistance, salt water resistance, chemical resistance and cosmetics resistance.

16 Claims, 3 Drawing Sheets

(51) Int. Cl.
  *C03C 15/00* (2006.01)
  *C03C 17/42* (2006.01)
(52) U.S. Cl.
  CPC ...... *C03C 2217/29* (2013.01); *C03C 2217/76* (2013.01); *C03C 2218/151* (2013.01); *C03C 2218/31* (2013.01)

(56) References Cited

U.S. PATENT DOCUMENTS

| | | | | |
|---|---|---|---|---|
| 6,686,049 | B1* | 2/2004 | Nakamura | C03C 17/008 428/428 |
| 6,991,826 | B2* | 1/2006 | Pellerite | C08G 65/226 118/719 |
| 7,217,440 | B2* | 5/2007 | Jallouli | B05D 3/141 427/162 |
| 2005/0008784 | A1* | 1/2005 | Martin | B08B 7/0035 427/393.4 |
| 2008/0038483 | A1* | 2/2008 | Goetz | C03C 17/42 427/576 |
| 2008/0286176 | A1* | 11/2008 | Schirmeister | B01J 15/005 422/198 |

FOREIGN PATENT DOCUMENTS

| | | |
|---|---|---|
| JP | 2006-289356 A | 10/2006 |
| KR | 10-2011-0138541 A | 12/2011 |
| KR | 10-2012-0139919 A | 12/2012 |

* cited by examiner

COMPOSITION OF FINGERPRINT-RESISTANT LAYER CONSISTING OF A PLURALITY OF THIN FILMS AND PREPARATION METHOD THEREFOR

CROSS REFERENCE TO RELATED APPLICATIONS

This application is the U.S. National Phase of International Application No. PCT/KR2014/003510, filed Apr. 23, 2013, designating the U.S. and published in Korean as WO 2014/142636 on Sep. 18, 2014 which claims the benefit of Korean Patent Application No. 10-2013-0025860, filed Mar. 11, 2013. Any and all applications for which a foreign or domestic priority claim is identified here or in the Application Data Sheet as filed with the present application are hereby incorporated by reference under 37 CFR 1.57.

TECHNICAL FIELD

The present invention relates, in some embodiments, to a composite of deposition materials including a metallic compound, and a method of manufacturing the same.

More specifically, the present invention, in certain embodiments, relates to a composite of a coating layer which is previously deposited when a water-repellent and oil-repellent material for fingerprint resistance is deposited on glass or plastic, and a method of manufacturing the same, and the present invention, in some embodiments, allows a deposited surface to have excellent abrasion resistance, salt water resistance, chemical resistance, and cosmetics resistance.

BACKGROUND ART

Anti-fingerprint coating is a technology for specially treating a surface of a substrate such as glass to prevent a contaminant such as a fingerprint from being attached to the surface and easily remove the contaminant even when the contaminant is attached to the surface, and is a surface treatment technology of applying a water-repellent and oil-repellent function of a thin film to a surface.

An externally exposed portion of various home appliances, that is, a window or a case of home appliances such as a mobile phone, a digital versatile disc, etc. has a portion exposed to a hand of a person, and a handprint (fingerprint) is frequently left on a clean surface thereof.

In particular, a smartphone or a tablet personal computer (PC) uses a window as input means, and thus fingerprint resistance is essential for a surface of the window.

Coding schemes has been developed for a coating for preventing a fingerprint from leaving on glass or plastic, and the coding schemes use technologies such as vacuum coating, dip coating, spray coating, etc. according to application fields thereof. A vacuum deposition technology using an electric beam which is mainly used to deposit a dielectric substance on a glass lens has been domestically developed.

The vacuum deposition technology is a technology for evaporating a fluorine compound in a vacuum to coat glass or plastic with a thin film made of the fluorine compound. In this technology, while a defective rate of a surface due to contaminants is low, there is a problem of low productivity due to a batch process. Even though large equipment has been developed to solve the problem, a high equipment investment cost has been a problem.

In liquid coating such as dip coating, spray coating, etc., productivity is high due to a continuous process. However, a defective rate is high when compared to vacuum coating, and performance is insufficient.

In addition, in existing deposition for fingerprint resistance, a fluorine compound for lowering surface energy is deposited on $SiO_2$.

When a water-repellent and oil-repellent material is directly deposited on glass or plastic, durability is degraded. Thus, to complement solve this problem, the water-repellent and oil-repellent material is deposited after $SiO_2$ is deposited.

Korean Patent publication No. 10-2011-138541 relates to a fingerprint resistant thin film structure having excellent durability and a formation method thereof. The fingerprint resistant thin film structure includes a substrate, a grain thin film layer which is formed in a two-dimensional shape on the substrate and includes a plurality of grains and a plurality of grain boundaries, and a fingerprint resistant coating layer which is formed on the grain thin film layer and made of a fingerprint resistant coating material. The fingerprint resistant coating material is formed to penetrate the plurality of grain boundaries to enhance durability of fingerprint resistance, and an undercoating layer is further included between the substrate and the grain thin film layer to enhance adhesive strength of the grain thin film layer, thereby increasing surface roughness of the fingerprint resistant coating layer. In this way, it is possible to prevent the fingerprint resistant coating layer from being easily removed due to abrasion to enhance durability with respect to fingerprint resistance. However, there remain a problem due to a high equipment investment cost, a problem of a high defective rate when compared to vacuum coating, and a problem of insufficient performance.

SUMMARY

A technical problem to be solved by at least some embodiments of the present invention is to provide a composite of a deposition material capable of having excellent abrasion resistance, salt water resistance, chemical resistance, and cosmetics resistance when compared to existing deposition and a deposition method for the same.

A composite for coating of a primer film of a water-repellent and oil-repellent coating film deposited to enhance durability of the water-repellent and oil-repellent coating film includes at least one of silicon oxide ($SiO_x$), a titanium (Ti) compound, an aluminum (Al) compound, and a zirconium (Zr) compound.

It is possible to include preparing a glass or polymer substrate, forming, on the substrate, a portion on which a fingerprint-resistant layer having a plurality of films is to be deposited by etching, depositing a primer film including the composite on the substrate including a portion on which a water-repellent and oil-repellent coating film is to be deposited, forming the water-repellent and oil-repellent coating film on the deposited primer film, and purging the substrate on which the water-repellent and oil-repellent coating film is formed.

A fingerprint-resistant layer deposited according to some embodiments of the present invention has a first effect of having excellent abrasion resistance, salt water resistance, chemical resistance, cosmetics resistance, etc. when compared to an existing product.

In addition, there is a second effect in that primer film of the fingerprint-resistant layer corresponding to a water-repellent and oil-repellent coating film can be used using various compounds in addition to SiO$_2$ which has been deposited to compensate for degradation of durability of an existing fingerprint resistant material.

Further, there is a third effect in that the primer film of the fingerprint-resistant layer, which is formed by depositing the water-repellent and oil-repellent coating film on the primer film, is deposited at a lower degree of vacuum than an existing degree of vacuum, and thus a deposition time can be reduced.

In this way, there is a fourth effect in that a cost per time can be reduced, productivity can be enhanced to reduce a total tack time of a process, thereby enhancing production efficiency.

REFERENCE SIGNS LIST

Figure 1:
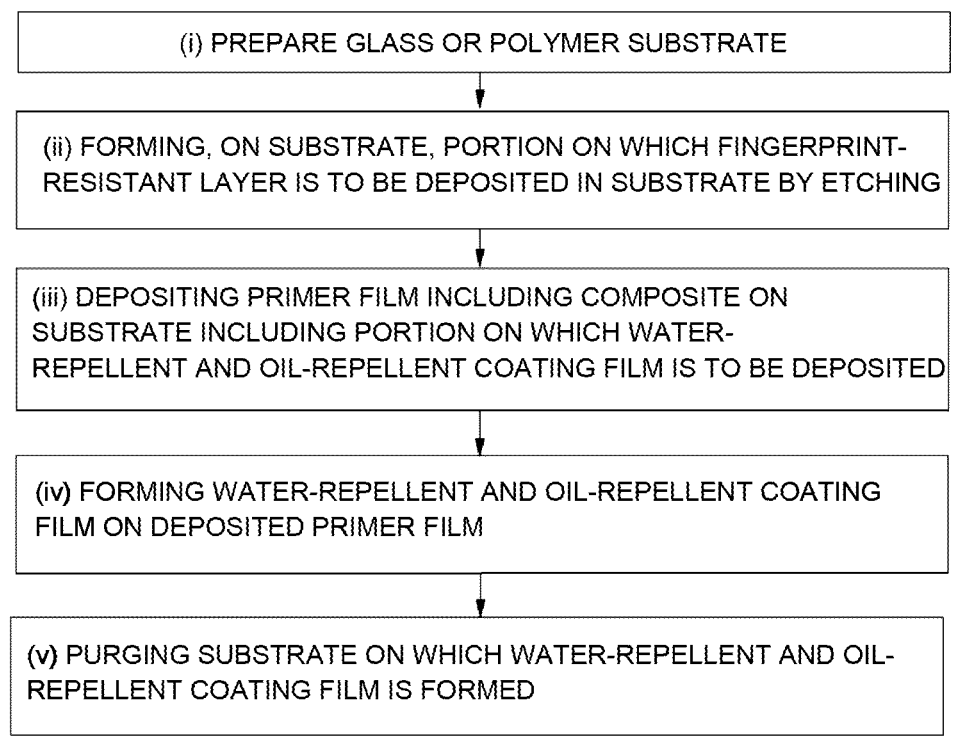
FIG. 1 is a flowchart illustrating a method of manufacturing a fingerprint-resistant layer having a plurality of thin films according to an embodiment of the present invention.

100: Substrate
200: Primer film
300: Water-repellent and oil-repellent coating film
400: Fingerprint-resistant layer
510: Electronic beam deposition source
520: Electronic beam
530: Electronic beam deposition substrate
540: Electronic beam evaporation molecule
550: W-Gun
560: Magnet
610: Resistance heating-type vacuum evaporation source
620: W-Boat
630: Resistance heating-type vacuum evaporation substrate
640: Resistance heating-type vacuum evaporation molecule

DETAILED DESCRIPTION OF CERTAIN EMBODIMENTS

A fingerprint-resistant layer 400 having a plurality of thin films according to some embodiments of the present invention may include a glass or polymer substrate 100, a primer film 200 formed on the substrate 100, and a water-repellent and oil-repellent coating film 300 formed on the primer film 200.

A composite for coating of the primer film 200 of a water-repellent and oil-repellent coating film deposited to enhance durability of the water-repellent and oil-repellent coating film 300 may include at least one of mixtures that contain at least one of silicon oxide (SiO$_x$), a titanium (Ti) compound, an aluminum (Al) compound, and a zirconium (Zr) compound.

Alternatively, the composite for coating of the primer film 200 of the water-repellent and oil-repellent coating film deposited to enhance durability of the water-repellent and oil-repellent coating film 300 may include one of or a combination of two or more of a Ti compound, an Al compound, and a Zr compound.

More specifically, the mixture preferably contains at least one of titanium dioxide (TiO$_2$), aluminum oxide (Al$_2$O$_3$), zirconium dioxide (ZrO$_2$), aluminum silicate (Al$_2$(SiO$_4$)O), and kaolin (Al$_2$Si$_2$O$_5$(OH)$_4$).

SiO$_x$ may correspond to at least one of quartz, cristobalite, tridymite, and amorphous silicon oxide.

In addition, the water-repellent and oil-repellent coating film 300 is preferably manufactured by depositing a compound containing at least one of fluoride (F) and silicon (Si).

FIG. 1 illustrates a method of manufacturing the fingerprint-resistant layer 400 having the plurality of thin films according to an embodiment of the present invention.

The method may include preparing the glass or polymer substrate 100, forming, on the substrate 100, a portion on which the fingerprint-resistant layer 400 including the plurality of films is to be deposited by etching, depositing the primer film 200 including the composite on the substrate 100 including a portion on which the water-repellent and oil-repellent coating film 300 is to be deposited, forming the water-repellent and oil-repellent coating film 300 on the deposited primer film 200, and purging the substrate 100 on which the water-repellent and oil-repellent coating film 300 is formed.

In addition, the preparation process of the substrate 100 may include cleaning the substrate using a wet cleaning agents.

The etching may be performed using at least one of ion etching and radio frequency (RF) plasma etching.

When ion etching is used in the etching, it is preferable that oxygen (O$_2$), argon (Ar), or gas of O$_2$ and Ar be ionized at a degree of vacuum of $7\times10^{-2}$ Torr to $2\times10^{-7}$ Torr, and a surface of a material be etched by causing a collision between an ionized gas ion and the surface of the material.

Most preferably, the etching is performed at a degree of vacuum of $6\times10^{-4}$ Torr. However, the present invention is not limited thereto.

In addition, when RF plasma etching is used in the etching, O$_2$, Ar, or gas of O$_2$ and Ar may be included and used.

The deposition process of the primer film 200 may be performed using at least one of thermal evaporation, electron beam evaporation, electron beam ion plating, sputtering, a sputtering ion plating system, laser molecular beam epitaxy, pulsed laser deposition, chemical vapor deposition, and ion-assist deposition.

Figure 3:
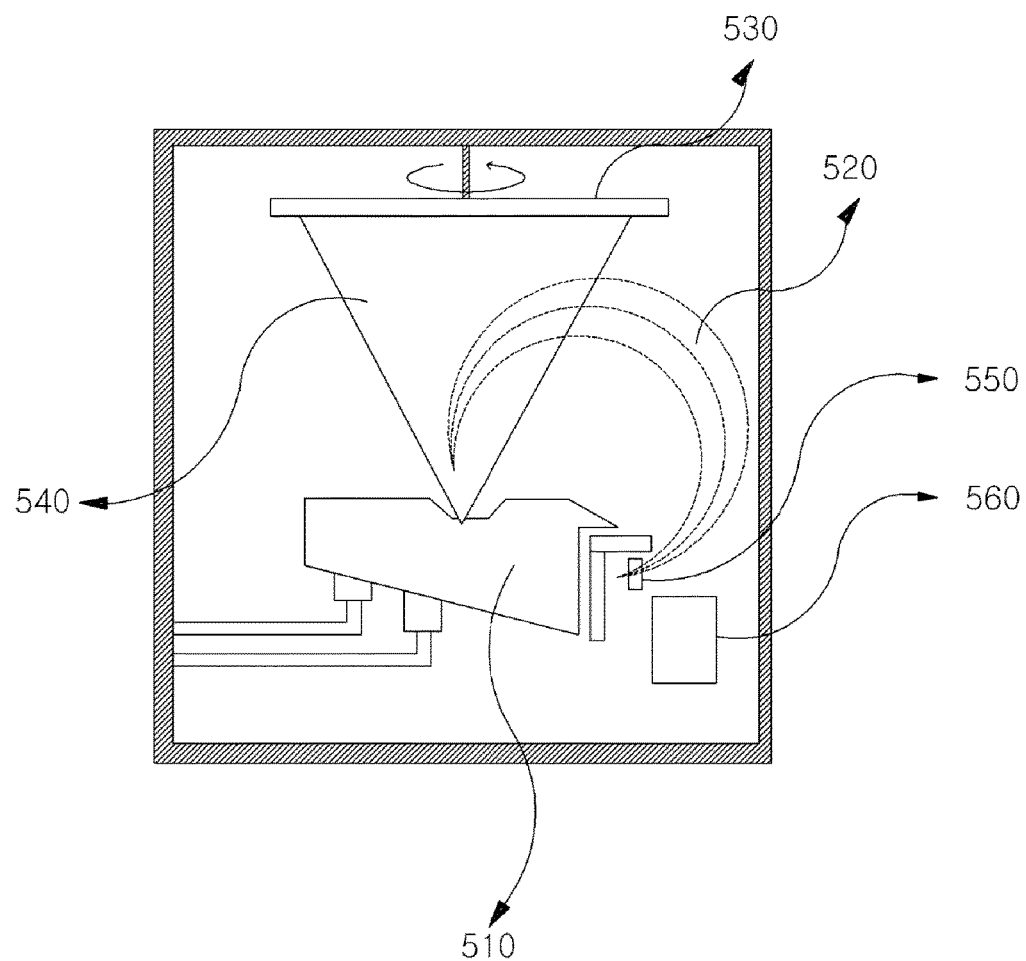
FIG. 3 is a diagram illustrating a configuration of an apparatus for electron beam evaporation according to an embodiment of the present invention.

FIG. 3 illustrates a configuration of an apparatus for electron beam evaporation according to an embodiment of the present invention.

In electron beam evaporation, an electronic beam 520 is emitted from a tungsten gun (W-Gun) 550 by a magnetic force of a magnet 560, and an electronic beam deposition source 510 is deposited as an electronic beam evaporation molecule 540 on an electronic beam deposition substrate 530.

Figure 4:
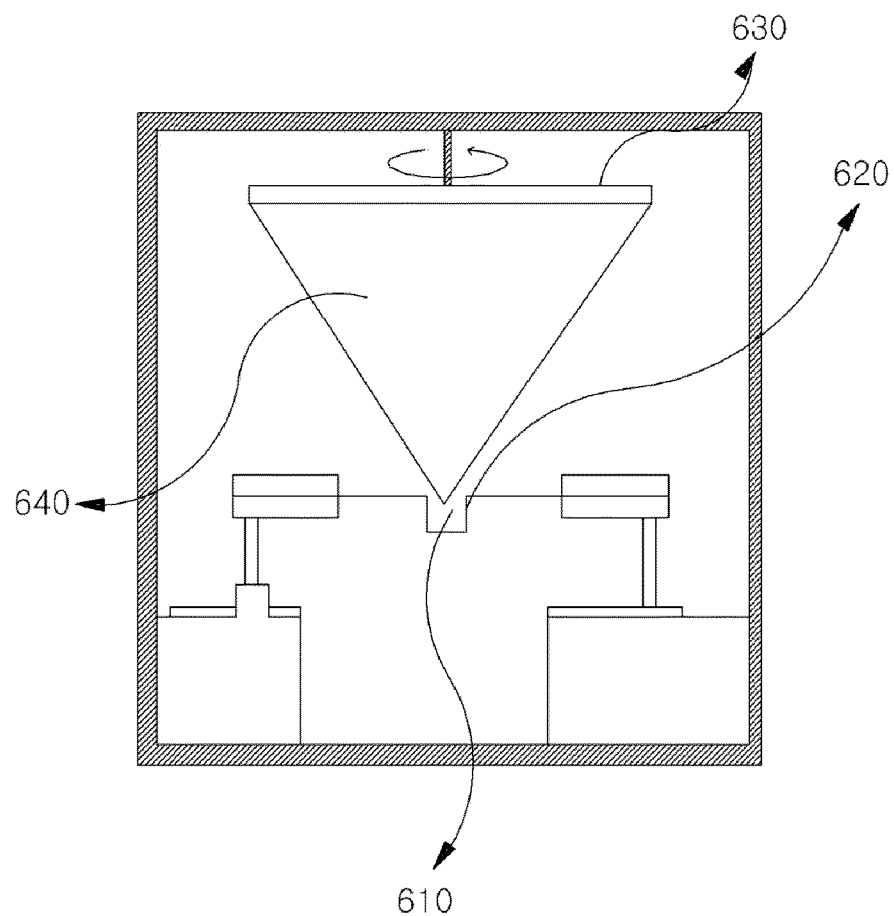
FIG. 4 is a diagram illustrating a configuration of an apparatus for resistance heating-type vacuum evaporation according to an embodiment of the present invention.

FIG. 4 illustrates a configuration of an apparatus for resistance heating-type vacuum evaporation according to an embodiment of the present invention.

In resistance heating-type vacuum evaporation, a resistance heating-type vacuum evaporation source 610 positioned in a tungsten container (W-Boat) 620 is heated, and the resistance heating-type vacuum evaporation source 610 is deposited as a resistance heating-type vacuum evaporation molecule 640 on a resistance heating-type vacuum evaporation substrate 630.

When the primer film is deposited using electron beam evaporation, a degree of vacuum is preferably set to $7 \times 10^{-2}$ Torr to $2 \times 10^{-7}$ Torr, and a temperature is preferably set to 20 to 180° C.

Most preferably, electron beam evaporation is performed at a degree of vacuum of $1.6 \times 10^{-4}$ Torr and a temperature of 20 to 150° C. However, the present invention is not limited thereto.

It is more preferable that the deposition of the primer film 200 be performed using electron beam evaporation, and ion-assist deposition using ion beam evaporation be performed at the same time.

An ion beam used for ion-assist deposition is preferably $O_2$, Ar, or gas of $O_2$ and Ar, and the number of emitted ion beams is preferably set to $1 \times 10^{13}/cm^2$ to $5 \times 10^{17}/cm^2$ at the time of ion-assist deposition.

When the water-repellent and oil-repellent coating film 300 is formed, the water-repellent and oil-repellent coating film 300 is preferably manufactured by depositing a compound containing at least one of F and Si.

In addition, the water-repellent and oil-repellent coating film 300 may be deposited using at least one of thermal evaporation, electron beam evaporation, electron beam ion plating, sputtering, a sputtering ion plating system, laser molecular beam epitaxy, pulsed laser deposition, chemical vapor deposition, and ion-assist deposition.

The water-repellent and oil-repellent coating film 300 is most preferably deposited using thermal evaporation. However, the present invention is not limited thereto.

When the water-repellent and oil-repellent coating film 300 is deposited using thermal evaporation, a degree of vacuum is preferably set to $7 \times 10^{-2}$ Torr to $2 \times 10^{-7}$ Torr, and a temperature is preferably set to 20 to 180° C.

Most preferably, the degree of vacuum is set to $1.6 \times 10^{-5}$ Torr, and the temperature is set to 20 to 150° C. However, the present invention is not limited thereto.

Deposition for fingerprint resistance having water repellence and oil repellence according to some embodiments of the present invention is conducted at a lower degree of vacuum than an existing high degree of vacuum, and thus a deposition time can be shortened.

The shortened deposition time has an effect of enhancing productivity to reduce a total tack time, enhancing production efficiency, and reducing a cost per time.

In addition, there is an effect of having excellent abrasion resistance, salt water resistance, chemical resistance, and cosmetics resistance when compared to existing deposition.

The primer film 200 of the water-repellent and oil-repellent coating film deposited to enhance durability of the water-repellent and oil-repellent coating film 300 according to some embodiments of the present invention is deposited by applying electron beam evaporation to the composite or applying ion-assist deposition that combines electron beam evaporation with ion beam evaporation thereto.

Figure 2:
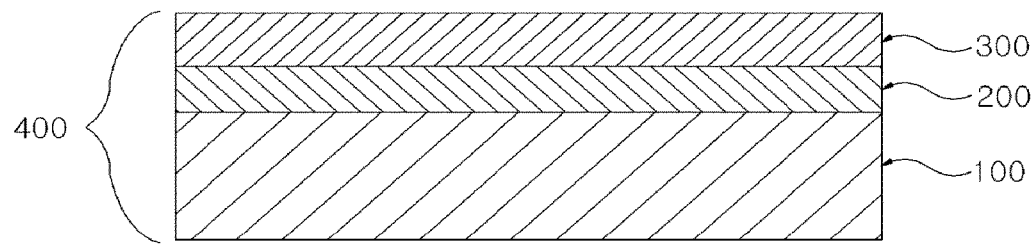
FIG. 2 is a cross-sectional view of the fingerprint-resistant layer having the plurality of thin films according to an embodiment of the present invention.

FIG. 2 is a cross-sectional view of the fingerprint-resistant layer 400 having the plurality of thin films according to the present embodiment.

The fingerprint-resistant layer 400 having the plurality of thin films may include the glass or polymer substrate 100, the primer film 200 of some embodiments of the present invention formed on the substrate 100, and the water-repellent and oil-repellent coating film 300 formed on the primer film 200.

The fingerprint-resistant layer 400 having the plurality of thin films according to some embodiments of the present invention may be used for an electronic device. Examples of the electronic device include a mobile phone, a tablet PC, etc. The fingerprint-resistant layer 400 may be used for a window in the mobile phone, and used for an outermost layer in the tablet PC.

EXAMPLES

Example 1

$SiO_2$ of 90 wt %, $Al_2O_3$ of 6 wt %, $ZrO_2$ of 2 wt %, and $TiO_2$ of 2 wt % in powder forms were mixed together, polyvinyl alcohol (PVA), polyethylene glycol (PEG), and oleic acid were mixed at a ratio of 5:2:3 using a binder, and then 1.2 wt % of the whole powders were added to spray and dry the powders. The sprayed and dried powders were pressed at a pressure of 600 kg/cm², and then sintered at 1150° C. for six hours.

Tempered glass was positioned in a chamber that can be vacuum-decompressed, a sintered primer was positioned at a place to be subjected to electron beam evaporation, a fingerprint-resistant medical was positioned at a place to be subjected to thermal evaporation, the chamber was vacuum-decompressed up to $1.8 \times 10^{-4}$ Torr using a vacuum pump, and then a substrate was etched using argon gas. After the substrate was etched, the chamber was set to $1.5 \times 10^{-4}$ Torr and 80° C., and the primer was deposited using electron beam evaporation.

Thereafter, deposition for water repellence and oil repellence was conducted using thermal evaporation. After this operation, vacuum was removed, and then deposition was finished. A thickness of a primer film obtained in this way was 150 Å, and a thickness of a water-repellent and oil-repellent coating film obtained in this way was 230 Å. A contact angle, adhesive property, abrasion resistance, salt water resistance, and chemical resistance of the deposited tempered glass were verified.

Example 2

$SiO_2$ of 90 wt %, $Al_2O_3$ of 8 wt %, and $ZrO_2$ of 2 wt % in powder forms were mixed together, PVA, PEG, and oleic acid were mixed at a ratio of 5:2:3 using a binder, and then 1.5 wt % of the whole powders were added to spray and dry the powders.

The sprayed and dried powders were pressed at a pressure of 550 kg/cm², and then sintered at 1200° C. for eight hours.

Tempered glass was positioned in a chamber that can be vacuum-decompressed, a sintered primer was positioned at a place to be subjected to electron beam evaporation, a fingerprint-resistant medical was positioned at a place to be subjected to thermal evaporation, the chamber was vacuum-decompressed up to $1.8 \times 10^{-4}$ Torr using a vacuum pump, and then a substrate was etched using argon gas. After the substrate was etched, the chamber was set to $1.5 \times 10^{-4}$ Torr and 80° C., and the primer was deposited using electron beam evaporation.

Thereafter, deposition for water repellence and oil repellence was conducted using thermal evaporation. After this operation, vacuum was removed, and then deposition was finished. A thickness of a primer film obtained in this way was 150 Å, and a thickness of a water-repellent and oil-repellent coating film obtained in this way was 230 Å. A contact angle, adhesive property, abrasion resistance, salt water resistance, and chemical resistance of the deposited tempered glass were verified.

Example 3

$SiO_2$ of 90 wt %, $Al_2O_3$ of 6 wt %, and $TiO_2$ of 4 wt % in powder forms were mixed together, PVA, PEG, and oleic acid were mixed at a ratio of 5:2:3 using a binder, and then 1.5 wt % of the whole powders were added to spray and dry the powders. The sprayed and dried powders were pressed at a pressure of 550 kg/cm², and then sintered at 1100° C. for ten hours.

Tempered glass was positioned in a chamber that can be vacuum-decompressed, a sintered primer was positioned at a place to be subjected to electron beam evaporation, a fingerprint-resistant medical was positioned at a place to be subjected to thermal evaporation, the chamber was vacuum-decompressed up to $1.8 \times 10^{-4}$ Torr using a vacuum pump, and then a substrate was etched using argon gas. After the substrate was etched, the chamber was set to $1.5 \times 10^{-4}$ Torr and 80° C., and the primer was deposited using electron beam evaporation.

Thereafter, deposition for water repellence and oil repellence was conducted using thermal evaporation. After this operation, vacuum was removed, and then deposition was finished. A thickness of a primer film obtained in this way was 150 Å, and a thickness of a water-repellent and oil-repellent coating film obtained in this way was 230 Å. A contact angle, adhesive property, abrasion resistance, salt water resistance, and chemical resistance of the deposited tempered glass were verified.

Example 4

$Al_2O_3$ of 95 wt % and $ZrO_2$ of 5 wt % in powder forms were mixed together, PVA, PEG, and oleic acid were mixed at a ratio of 5:2:3 using a binder, and then 1.0 wt % of the whole powders were added to spray and dry the powders. The sprayed and dried powders were pressed at a pressure of 600 kg/cm², and then sintered at 1650° C. for eight hours.

Tempered glass was positioned in a chamber that can be vacuum-decompressed, a sintered primer was positioned at a place to be subjected to electron beam evaporation, a fingerprint-resistant medical was positioned at a place to be subjected to thermal evaporation, the chamber was vacuum-decompressed up to $1.8 \times 10^{-4}$ Torr using a vacuum pump, and then a substrate was etched using argon gas. After the substrate was etched, the chamber was set to $1.5 \times 10^{-4}$ Torr and 80° C., and the primer was deposited using electron beam evaporation.

Thereafter, deposition for water repellence and oil repellence was conducted using thermal evaporation. After this operation, vacuum was removed, and then deposition was finished. A thickness of a primer film obtained in this way was 150 Å, and a thickness of a water-repellent and oil-repellent coating film obtained in this way was 230 Å. A contact angle, adhesive property, abrasion resistance, salt water resistance, and chemical resistance of the deposited tempered glass were verified.

Comparative Example 1

Tempered glass was positioned in a chamber that can be vacuum-decompressed, $SiO_2$ was positioned at a place to be subjected to electron beam evaporation, a water-repellent and oil-repellent medical was positioned at a place to be subjected to thermal evaporation, the chamber was vacuum-decompressed up to $3.5 \times 10^{-5}$ Torr using a vacuum pump, and then a substrate was etched using argon gas. After the substrate was etched, the chamber was set to $2.5 \times 10^{-5}$ Torr and 80° C., and $SiO_2$ was deposited using electron beam evaporation.

Thereafter, deposition for water repellence and oil repellence was conducted using thermal evaporation. After this operation, vacuum was removed, and then deposition was finished. A thickness of an $SiO_2$ coating film obtained in this way was 120 Å, and a thickness of a water-repellent and oil-repellent coating film obtained in this way was 210 Å. A contact angle, adhesive property, abrasion resistance, salt water resistance, and chemical resistance of the deposited tempered glass were verified.

TABLE 1

Initial contact angle

| | Division Contact angle before reliability (Initial contact angle) | | |
|---|---|---|---|
| Items | Abrasion resistance | Chemical resistance | Salt spray |
| Spec | | 110°~125° | |
| Example 1 | 116.5 | 116.9 | 117.2 |
| Example 2 | 117.2 | 117.5 | 117.1 |
| Example 3 | 116.8 | 116.1 | 117.5 |
| Example 4 | 116.4 | 117.3 | 116.7 |
| Comparative example 1 | 117.1 | 116.8 | 117.1 |

Contact Angle Test Method

A liquid having a volume of 3 μL is dropped at 600 μL/Min into a middle of a sample using distilled water in a contact angle measuring instrument. After three seconds from dosing, a contact angle is measured.

TABLE 2

Adhesive property

| Item | Adhesive property |
|---|---|
| Example 1 | ⊚ |
| Example 2 | ⊚ |
| Example 3 | ⊚ |
| Example 4 | ⊚ |
| Comparative example 1 | ⊚ |

⊚: very excellent,
○: excellent,
Δ: moderate,
X: poor

Adhesive Property Test Method

Lines are drawn at an interval of 1 mm on a sample to reach a film, thereby creating a check. A tape is attached thereto to strongly pull the sample in a vertical direction. This operation is repeated three times to determine whether a machined surface is separated when the tape is attached and detached.

TABLE 3

Pencil hardness

| Item | Pencil hardness |
|---|---|
| Example 1 | 9H |
| Example 2 | 9H |
| Example 3 | 9H |
| Example 4 | 9H |
| Comparative example 1 | 9H |

Pencil Hardness Test Method

Only a wood part of a pencil is cut such that a lead of 3 mm is exposed in a cylindrical shape. In this state, the lead is vertically put on sandpaper placed on a flat surface and polished while drawing a circle. In this way, a tip of the lead is made flat and an angle is made sharp. The pencil lead comes into contact with a surface of a fragment of the sample at an angle of about 45 degrees and a load of 1 kg and moves by 10 mm at a constant speed. This operation is repeated five times by changing a position of the sample.

TABLE 4

Abrasion resistance

Contact angle after abrasion resistance reliability

| Items | Initial contact angle | 1500 times | +500 times 2000 times | +500 times 2500 times | +500 times 3000 times | +1000 times 4000 times | +1000 times 5000 times | +2000 times 7000 times | +2000 times 9000 times | +2000 times 11000 times |
|---|---|---|---|---|---|---|---|---|---|---|
| Spec | ±15° when compared to initial contact angle | | | | | | | | | |
| Example 1 | 116.5 | 113.4 | 111.4 | 108.2 | 106.7 | 107.5 | 104.3 | 103.4 | 102.8 | 101.3 |
| Example 2 | 117.2 | 115.6 | 114.9 | 114.1 | 112.6 | 109.5 | 105.3 | 102.9 | 101.7 | |
| Example 3 | 116.8 | 114.7 | 112.6 | 110.6 | 108.5 | 104.3 | 103.2 | 101.5 | | |
| Example 4 | 116.4 | 115.1 | 112.5 | 111.6 | 109.4 | 106.5 | 104.3 | 103.7 | 102.6 | 101.2 |
| Comparative example 1 | 117.1 | 105.8 | 104.1 | 102.5 | 100.5 | 107.6 | 103.9 | 102 | | |

Abrasion Resistance Test Method

A load of 500 g is applied to a pencil eraser, and then the eraser is put on a surface of a fragment of a sample to reciprocate (40 reciprocations/min).

Within a change amount of ±15° when compared to an initial contact angle, whether a coating is peeled off in external appearance is determined.

TABLE 5

Chemical resistance

Contact angle reliability after chemical resistance

| Item | Initial contact angle | 250 times | +50 times 300 times | +50 times 350 times | +50 times 400 times | +100 times 500 times | +100 times 600 times |
|---|---|---|---|---|---|---|---|
| Spec | ±10° when compared to initial contact angle | | | | | | |
| Example 1 | 116.9 | 115.4 | 113.1 | 100.8 | 108.5 | | 106.5 |
| Example 2 | 117.5 | 115.3 | 113.2 | 110.9 | 109.5 | 107.4 | |
| Example 3 | 116.1 | 114.8 | 111.5 | 107.6 | 105.9 | | |
| Example 4 | 117.3 | 113.2 | 112.1 | 110.8 | 109.2 | 107.1 | |
| Comparative example 1 | 116.8 | 113.2 | 111.7 | 109.4 | 107.9 | 106.5 | |

Chemical Resistance Test Method

A load of 500 g is applied to a pencil eraser, and then the eraser is put on a surface of a fragment of a sample. Under the condition that methyl alcohol does not dry, the eraser reciprocates while insertion is continued (40 reciprocations/min).

Within a change amount of ±10° when compared to an initial contact angle, whether a coating is peeled off in external appearance is determined.

TABLE 6

Salt water resistance

| Item | Initial contact angle | 72 hr | +24 hr 4 days | +24 hr 5 days | +24 hr 6 days | +24 hr 7 days | +24 hr 8 days | +48 hr 10 days | +48 hr 12 days |
|---|---|---|---|---|---|---|---|---|---|
| Spec | ±10° when compared to initial contact angle | | | | | | | | |
| Example 1 | 117.2 | 115.4 | 114.6 | 113.8 | 111.8 | 109.6 | 108.5 | 107.9 | 107.1 |
| Example 2 | 117.1 | 115.7 | 114.2 | 112.7 | 110.5 | 108.6 | 107.4 | 107.0 | |
| Example 3 | 117.5 | 116.1 | 113.4 | 112.7 | 111.6 | 109.4 | 107.3 | 106.8 | |
| Example 4 | 116.7 | 115.4 | 114.9 | 114.5 | 112.4 | 110.8 | 108.5 | 107.5 | 106.4 |
| Comparative example 1 | 117.1 | 114.3 | 111.3 | 109.4 | 107.8 | 106.9 | | | |

Salt Water Resistance Test Method

After 5% NaCl is sprayed on a sample at 35 degrees, the sample is rinsed and then dried. Then, the sample is left for four hours at room temperature. Within a change amount of ±10° when compared to an initial contact angle, whether a coating is peeled off in external appearance is determined.

Although some embodiments of the present invention have been described with reference to the accompanying drawings, they are merely examples of various embodiments containing the subject matter of the present invention, and are intended to allow those skilled in the art to easily implement various embodiments of the present invention. Thus, it is clear that the present invention is not restricted to the embodiments described above. Therefore, all technical spirits that fall within an equivalent range by change, substitution, replacement, etc. within the subject matter of the present invention will be included in the scope of a right of the present invention. In addition, some components of the drawings are intended to more clearly describe configurations, and thus it is clarified that the components are exaggerated or minimized when compared to actual components.

INDUSTRIAL APPLICABILITY

A fingerprint-resistant layer deposited by some embodiments of the present invention has excellent abrasion resistance, salt water resistance, chemical resistance, cosmetics resistance, etc. when compared to an existing product, and it is possible to use a primer film of a fingerprint resistant film corresponding to a water-repellent and oil-repellent coating film using various compounds in addition to SiO2 which has been deposited to compensate for degradation of durability of an existing fingerprint resistant material. In addition, the primer film of the fingerprint-resistant layer, which is formed by depositing the water-repellent and oil-repellent coating film on the primer film, is deposited at a lower degree of vacuum than an existing degree of vacuum, and thus a deposition time can be reduced. In this way, there is industrial availability in that a cost per time can be reduced, productivity can be enhanced to reduce a total tack time of a process, thereby enhancing production efficiency.

What is claimed is:

1. A method of manufacturing a fingerprint-resistant layer having a plurality of thin films, comprising:
   (i) preparing a glass or polymer substrate;
   (ii) forming, on the substrate, a portion on which the fingerprint-resistant layer is to be deposited within the substrate by etching;
   (iii) depositing a primer mixture on the substrate including the portion on which a water-repellent and oil-repellent coating film is to be deposited, to form a primer film, wherein the primer mixture comprises silicon oxide ($SiO_x$) in an amount of 90 wt %, a titanium (Ti) compound in an amount of 2 wt %, an aluminum (Al) compound in an amount of 6 wt %, and a zirconium (Zr) compound in an amount of 2 wt %;
   (iv) forming the water-repellent and oil-repellent coating film on the deposited primer film; and
   (v) purging the substrate on which the water-repellent and oil-repellent coating film is formed.

2. The method according to claim 1, further comprising cleaning the substrate using a wet cleaning agent between
   (i) the preparing and (ii) the forming of the portion.

3. The method according to claim 1, wherein the etching is performed using at least one of ion etching and radio frequency (RF) plasma etching in (ii) the forming of the portion.

4. The method according to claim 3, wherein oxygen ($O_2$), argon (Ar), or gas of $O_2$ and Ar is ionized at a degree of vacuum of $7 \times 10^{-2}$ Torr to $2 \times 10^{-7}$ Torr, and a surface of a material is etched by causing a collision between an ionized gas ion and the surface of the material when ion etching is used in (ii) the forming of the portion.

5. The method according to claim 3, wherein $O_2$, Ar, or gas of $O_2$ and Ar is included and used when RF plasma etching is used in (ii) the forming of the portion.

6. The method according to claim 1, wherein the primer mixture comprises at least one selected from the group consisting of $SiO_x$, $TiO_2$, $Al_2O_3$, $ZrO_2$, $Al_2(SiO_4)O$, and $Al_2Si_2O_5(OH)_4$ in (iii) the depositing.

7. The method according to claim 6, wherein $SiO_x$ comprises at least one selected from the group consisting of quartz, cristobalite, tridymite, and amorphous silicon oxide.

8. The method according to claim 1, wherein the depositing includes depositing the primer mixture using at least one selected from the group consisting of thermal evaporation, electron beam evaporation, electron beam ion plating, sputtering, a sputtering ion plating system, laser molecular beam epitaxy, pulsed laser deposition, chemical vapor deposition, and ion-assist deposition.

9. The method according to claim 8, wherein the depositing includes depositing the primer mixture using electron beam evaporation, wherein a degree of vacuum is set to $7 \times 10^{-2}$ Torr to $2 \times 10^{-7}$ Torr, and a temperature is set to 20° C. to 180° C. when the primer film is deposited using the electron beam evaporation.

10. The method according to claim 8, wherein the depositing includes depositing the primer mixture using ion-assist deposition, wherein the ion-assist deposition is conducted by combining the electron beam evaporation with the ion beam evaporation.

11. The method according to claim 10, wherein (iii) the depositing includes using $O_2$, Ar, or gas of $O_2$ and Ar as an ion beam used for the ion beam evaporation.

12. The method according to claim 10, wherein (iii) the depositing includes setting the number of emitted ion beams to $1 \times 10^{13}/cm^2$ to $5 \times 10^{17}/cm^2$ during the ion-assist deposition.

13. The method according to claim 1, wherein (iv) the forming of the water-repellent and oil-repellent coating film includes manufacturing the water-repellent and oil-repellent coating film by depositing a compound containing at least one of F and Si.

14. The method according to claim 1, wherein (iv) the forming of the water-repellent and oil-repellent coating film includes depositing the water-repellent and oil-repellent coating film using at least one selected from the group consisting of thermal evaporation, electron beam evaporation, electron beam ion plating, sputtering, a sputtering ion plating system, laser molecular beam epitaxy, pulsed laser deposition, chemical vapor deposition, and ion-assist deposition.

15. The method according to claim 14, wherein a degree of vacuum is set to $7 \times 10^{-2}$ Torr to $2 \times 10^{-7}$ Torr, and a temperature is set to 20° C. to 180° C. when the water-repellent and oil-repellent coating film is deposited using the thermal evaporation.

16. The method according to claim 1, wherein the primer mixture is sintered before depositing.

* * * * *